United States Patent
Arikara et al.

(10) Patent No.: US 7,166,985 B1
(45) Date of Patent: *Jan. 23, 2007

(54) FUEL CELL POWER SYSTEM HAVING A PLURALITY OF RACK FUEL CELL POWER MODULES

(75) Inventors: Muralidharan P. Arikara, Folsom, CA (US); Lawrence R. Bawden, Jr., El Dorado Hills, CA (US); William Jackson Berger, Boston, MA (US); Barbara H. Van Fleet, Folsom, CA (US)

(73) Assignee: Jadoo Power Systems, Inc., Folsom, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/186,327

(22) Filed: Jul. 21, 2005

Related U.S. Application Data

(62) Division of application No. 10/382,549, filed on Mar. 5, 2003, now Pat. No. 6,989,651.

(60) Provisional application No. 60/362,559, filed on Mar. 5, 2002.

(51) Int. Cl.
*H01M 10/46* (2006.01)

(52) U.S. Cl. .................................. 320/101

(58) Field of Classification Search ............... 320/101, 320/116; 429/12, 19, 22; 361/600, 611, 361/613, 730
See application file for complete search history.

(56) References Cited

U.S. PATENT DOCUMENTS

| | | | |
|---|---|---|---|
| 4,310,605 A * | 1/1982 | Early et al. | 429/18 |
| 5,136,300 A | 8/1992 | Clarke et al. | |
| 5,563,780 A | 10/1996 | Goad | |
| 5,969,435 A | 10/1999 | Wilhelm | |
| 6,198,178 B1 | 3/2001 | Schienbein et al. | |
| 6,569,555 B1 | 5/2003 | Faris et al. | |
| 6,577,026 B1 * | 6/2003 | Faller et al. | 307/86 |
| 6,628,011 B1 | 9/2003 | Droppo et al. | |
| 6,770,105 B1 | 8/2004 | Berlin et al. | |
| 6,882,063 B1 | 4/2005 | Droppo et al. | |
| 6,989,651 B1 * | 1/2006 | Arikara et al. | 320/116 |
| 2004/0067403 A1 | 4/2004 | Walsh et al. | |

* cited by examiner

*Primary Examiner*—Edward H. Tso
(74) *Attorney, Agent, or Firm*—Neil A. Steinberg

(57) ABSTRACT

A fuel cell power module is provided. The module comprises (a) power production unit, (b) a power conditioning and protection unit, and (c) a control unit, each unit being modules and integrated into a module for independent removal. Multiple modules are networked so that each module is connected to a master controller so that if one module is removed from operation, the other is able to continue operation.

54 Claims, 10 Drawing Sheets

FUEL CELL POWER SYSTEM HAVING A PLURALITY OF RACK FUEL CELL POWER MODULES

RELATED APPLICATION

This application is a divisional of application Ser. No. 10/382,549, filed Mar. 5, 2003 (now U.S. Pat. No. 6,989, 651), which claims priority to U.S. Provisional Application Ser. No. 60/362,559, filed Mar. 5, 2002. This application also claims priority to U.S. Provisional Application Ser. No. 60/362,559.

FIELD OF THE INVENTION

This invention relates to a network power system using fuel cell technology to provide a source of reliable, clean electricity useful for running computer-related systems and other electricity-using systems.

BACKGROUND OF THE INVENTION

Communication infrastructure facilities, banks, and business customers with mission-critical processes require high-quality and reliable power that the current electrical grid is unable to provide. These applications use the grid backed up by an Uninterruptible Power Systems (UPS), which generally uses a battery and diesel generator supplement to ensure uninterrupted power. The UPS is also available to "clean" the power (e.g. by reducing harmonics), whether originating from the grid or from the diesel generator to ensure quality and reliability of electrical power.

We have now invented a network of fuel cells that may be used to supplement the use of the power grid or replace it (along with the UPS and back up power). The network will be capable of sustaining faults without affecting the quality of the electricity supplied, resulting in high system reliability.

SUMMARY OF THE INVENTION

A network of fuel cell power modules, also referred to as rack power modules (RPMs), supplied with hydrogen (or other appropriate fuel), whose operation is overseen by a central control system, allows for a system of power sources that feed into common electrical buses.

One aspect of this invention is a fuel cell power module that comprises (a) a power production unit, (b) a power conditioning and protection unit, and (c) a control unit, each unit being modular in nature and being integrated into the fuel cell power module so that an individual unit can be independently removed during operation of the module. Preferably the fuel cell power module comprises an active module having units (a), (b), and (c) contained therein and a back plane module having connections communicating with units (a), (b), and (c). Generally the back plane module has fluid, power, and data interfaces that interconnect to corresponding fluid, power, and data interfaces of the active unit, preferably in a single action.

Another aspect of the invention is a networked fuel cell power system that comprises at least two fuel cell power modules wherein each power module is in communication with a computer master controller unit that communicates with the control unit of each fuel cell power module so that if one fuel cell power module is removed from operation, the other is able to provide the power required by automatically increasing its power output. The networked fuel cell power system may be connected to a DC/DC converter or a DC/AC inverter through the power production units to ensure a regulated voltage output.

Another aspect of the invention is the networked fuel cell power system wherein hydrogen is supplied to the power production units and the control unit monitors control the operation of the power production units resulting in autonomous operation of the active module. Preferably the system is designed so that a failure of any one fuel cell power module will result in the remaining power modules automatically raising their output power without affecting the voltage of the power buses associated with the system.

Where the hydrogen is the fuel for the system, it may be stored as gas or derived from a primary or secondary hydride.

The network power system may use dual feed hydrogen supply manifolds wherein actuated valves are used to segment the manifolds allowing isolation of individual sections of the manifold by shutting down valves while continuing supply of hydrogen to the individual fuel cell power modules.

Dual hydrogen exhaust manifolds may be used wherein actuated valves are used to segment the manifolds allowing isolation of individual sections of the manifold while allowing all the fuel cell power modules to purge hydrogen. Similarly dual coolant pumps are used to supply coolant to dual feed inlet and outlet manifolds that connect to the individual fuel cell power modules.

The system is designed so that failure of computer master controllers results in transfer of all control functions to the individual rack power systems resulting in continued operation of the rack power systems.

DETAILED DESCRIPTION OF THE INVENTION AND PREFERRED EMBODIMENTS

Fuel cell types are generally characterized by electrolyte material. The electrolyte is the substance between the positive and negative terminals, serving as the bridge for the ion exchange that generates electrical current.

While there are dozens of types of fuel cells to which this invention may apply, there are six principle kinds of fuel cell types that are particularly useful.
1. Alkaline Fuel Cell (AFC)
2. Molten Carbonate Fuel Cell (MCFC)
3. Phosphoric Acid Fuel Cell (PAFC)
4. Proton Exchange Membrane Fuel Cell (PEMFC)
5. Solid Oxide Fuel Cell (SOFC)
6. Direct Methanol Fuel Cell The details of this invention will be described primarily with the preferred PEMFC in mind using hydrogen as a fuel source.

One aspect of this invention is a fuel cell power module that comprises (a) a power production unit, (b) a power conditioning and protection unit, and (c) a control unit, each unit being modular in nature and being integrated into the module so that an individual unit can be independently removed during operation of the module.

The fuel cell power module also is referred to as rack power module (50). The modules can be electrically connected together to form a fault-tolerant power network. See FIG. 1.

Figure 1:
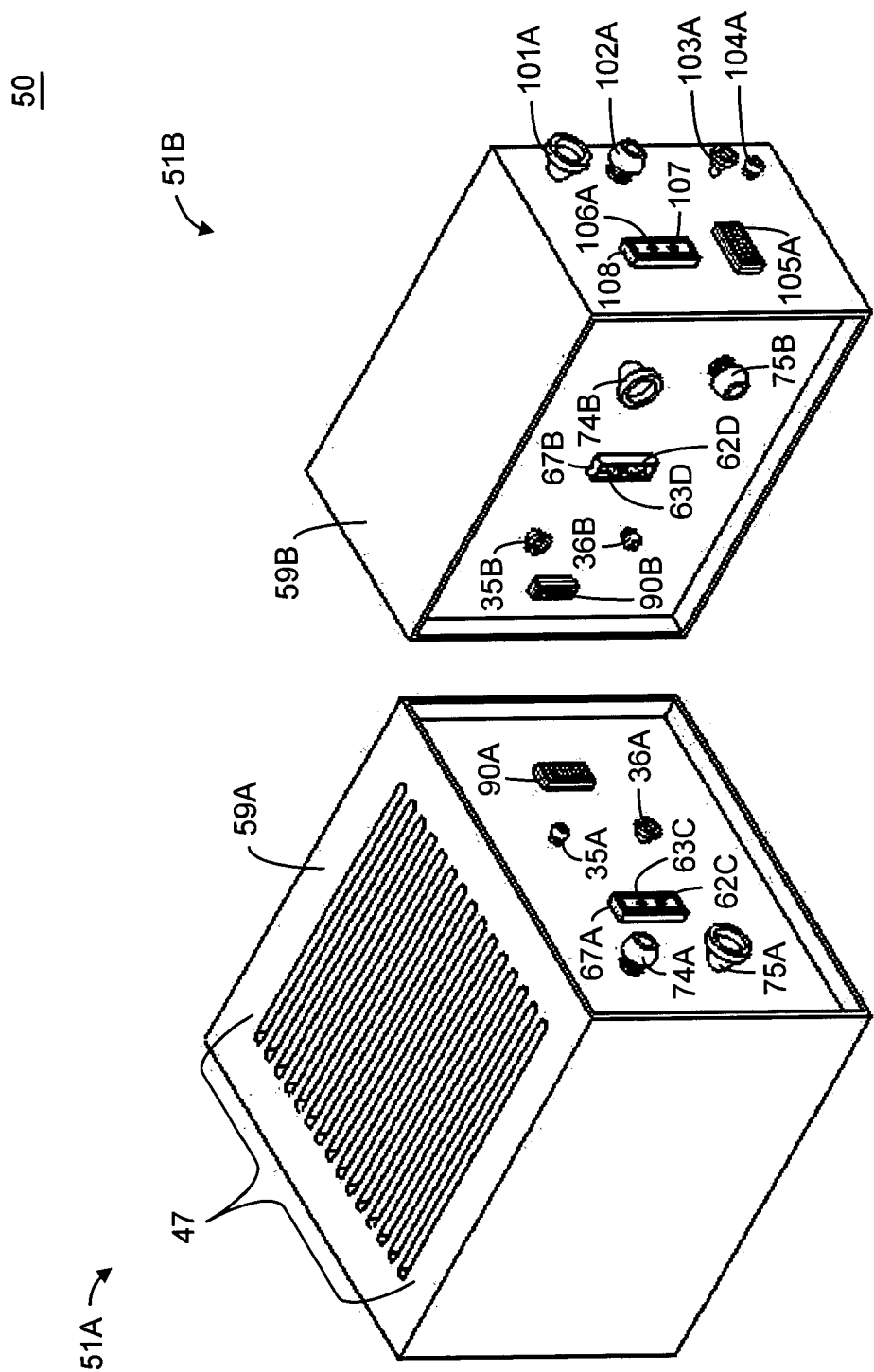
FIG. 1 represents a view of the rack power module with the active and back plane modules.

In one embodiment the rack power module (50) is made up of two parts; see FIG. 1, the active module (51,A) and a back plane module (51 B). Preferably the active module (51A) can be attached to or detached from the back plane module (51 B) by a single action, effectively isolating the active module (51A) from the back plane module (51 B). Generally, the back plane module (51B) provides the hardware that creates the interconnection of the RPM (50) to the electrical power buses (18,19), the hydrogen manifolds (15,16), the coolant manifolds (8,9) and the control bus (17). See FIG. 2.

Figure 2:
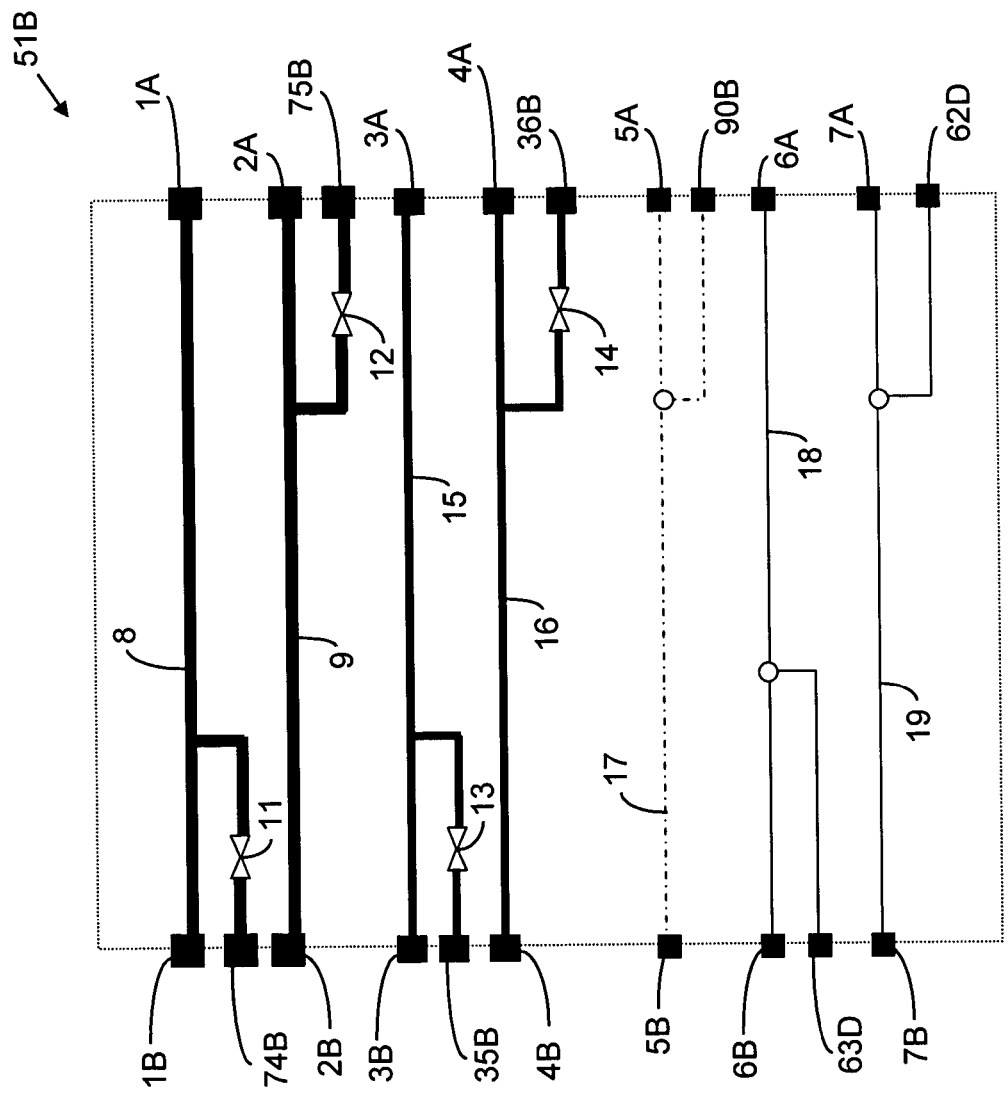
FIG. 2 represents the schematic of fluid, electrical power and control flows and terminals in the back plane module.
Figure 3:
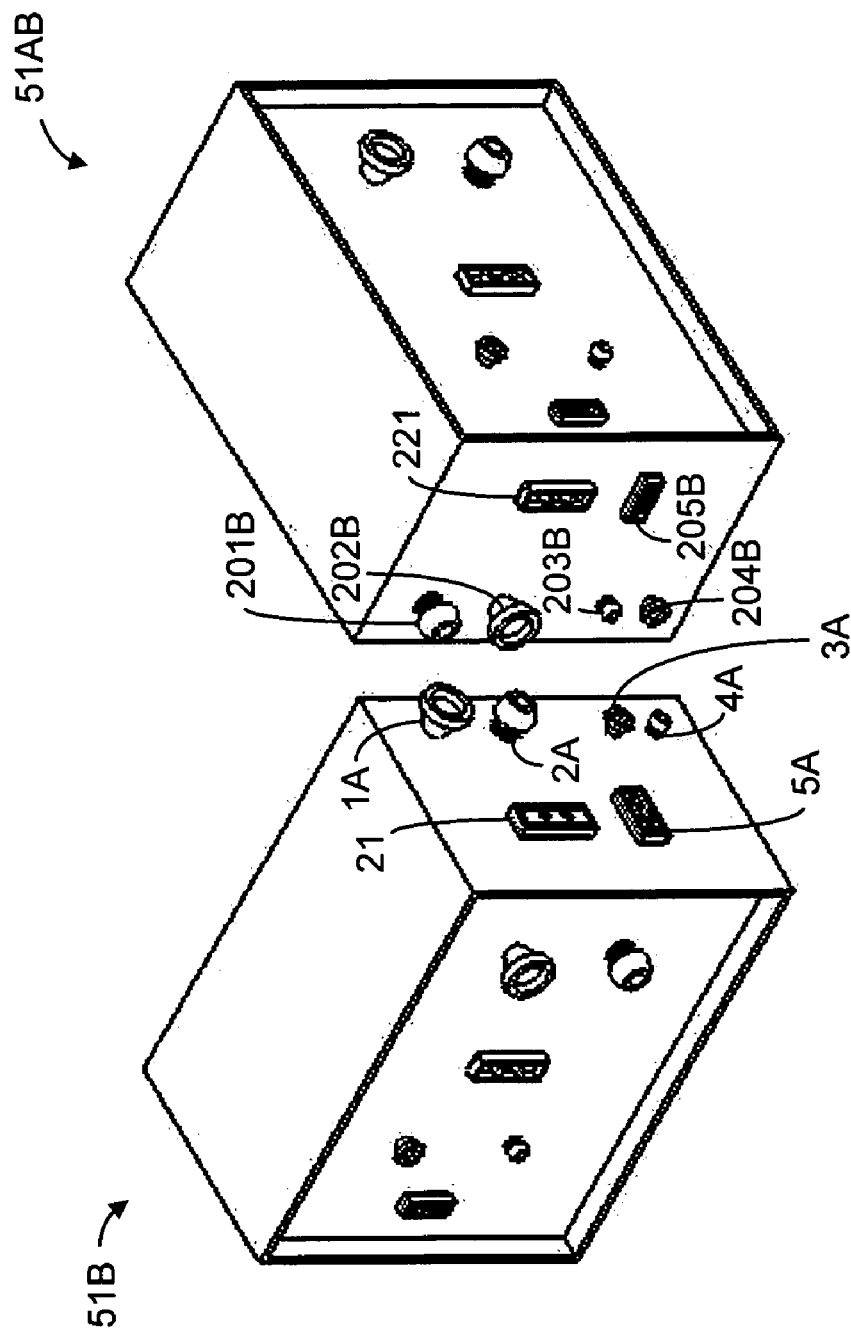
FIG. 3 represents the connection between two back plane modules which aids in creating the fluid distribution manifolds and the power and control buses.

Two or more back planes (51B, 51AB) can be connected together, see FIGS. 2 & 3. In this embodiment the connection between the coolant manifolds (1A, 201B, 2A, 202B) extends the coolant distribution manifolds (8,9). The connection between the hydrogen manifolds (3A, 203B, 4A, 204B) extends the hydrogen manifolds (15,16), the connection between the power connectors (21,221) extends the electrical buses (18,19) and the connection between the control connectors (5A, 205B) extends the control bus (17).

Figure 4:
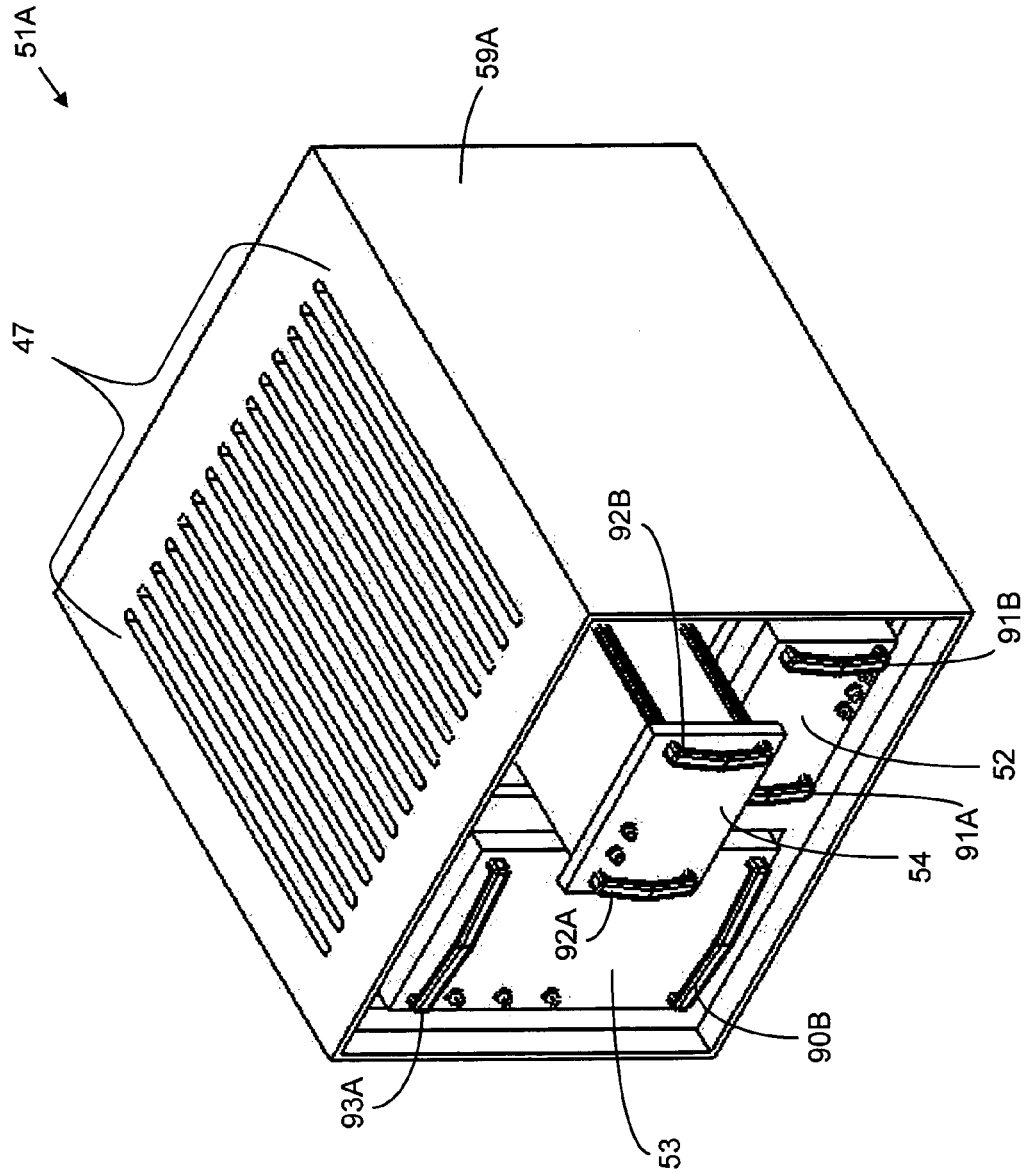
FIG. 4 is a view of the active module of the rack power module that shows the power production subsystem, power conditioning and protection subsystem and the control subsystem.
Figure 5:
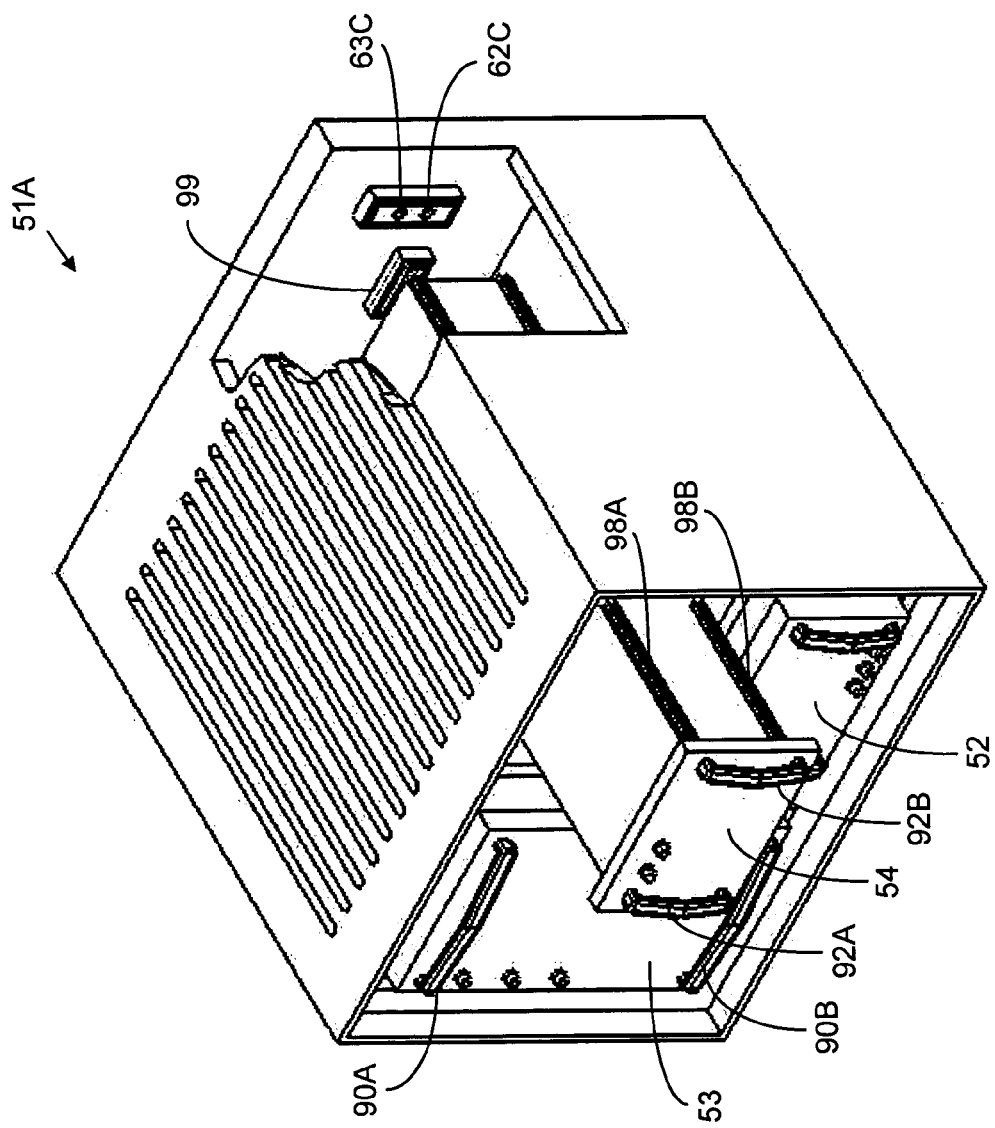
FIG. 5 is a view of the active module of the rack power module that represents the power conditioning and protection subsystem in an inactive position along with a cutaway view of the connection interface to the power conditioning and protection subsystem.

Two or more back plane modules (51B, 51AB) can be mated together by ensuring the respective connectors (1A, 201B, 2A, 202B, 3A, 203B, 4A, 204B, 21,221, 5A, 205B) mate together to extend the respective manifolds (8,9,15,16) and buses (18,19, 17). The two backplanes (51 B, 51AB) can be interconnected using extensions that complete the respective connections (1A, 201B, 2A, 202B, 3A, 203B, 4A, 204B, 21,221, 5A, 205B) between the two backplanes (51 B, 51 AB). Manual valves (11, 12, 13, 14) are used to isolate the fluids in the backplane module (51 B) from the active module (51 A). The active module (51A) consists of three functional subsystems; the power production unit (53), the power conditioning & protection unit (54) and the control unit (52). See FIG. 4. In one embodiment the three subsystems (52, 53, 54) are modular in nature and any one of the three subsystems (52, 53, 54) can be removed from the active module (51 A) by a single action. The three subsystems (52,53,54) can be accessed from the front of the active module (51A) and each of the subsystems can be removed and replaced easily by pulling on the respective handles (90A,90B,91A,91B,92A,92B). See FIG. 5. The power conditioning and protection subsystem (54) can slide on guide ways (98A, 98B) with corresponding guides connected to the framework of the active module (51A) not shown here. When this subsystem (54) is fully set into the active module (51A) the required connectors (99, 62C, 63C) complete all required connections of the subsystem (54) with the active module (51A). See FIG. 5. Other embodiments for connection of the power production subsystem (53) and the control subsystem (52) are not shown here but are accomplished in the same manner as the power conditioning and protection subsystem (54).

Figure 6A:
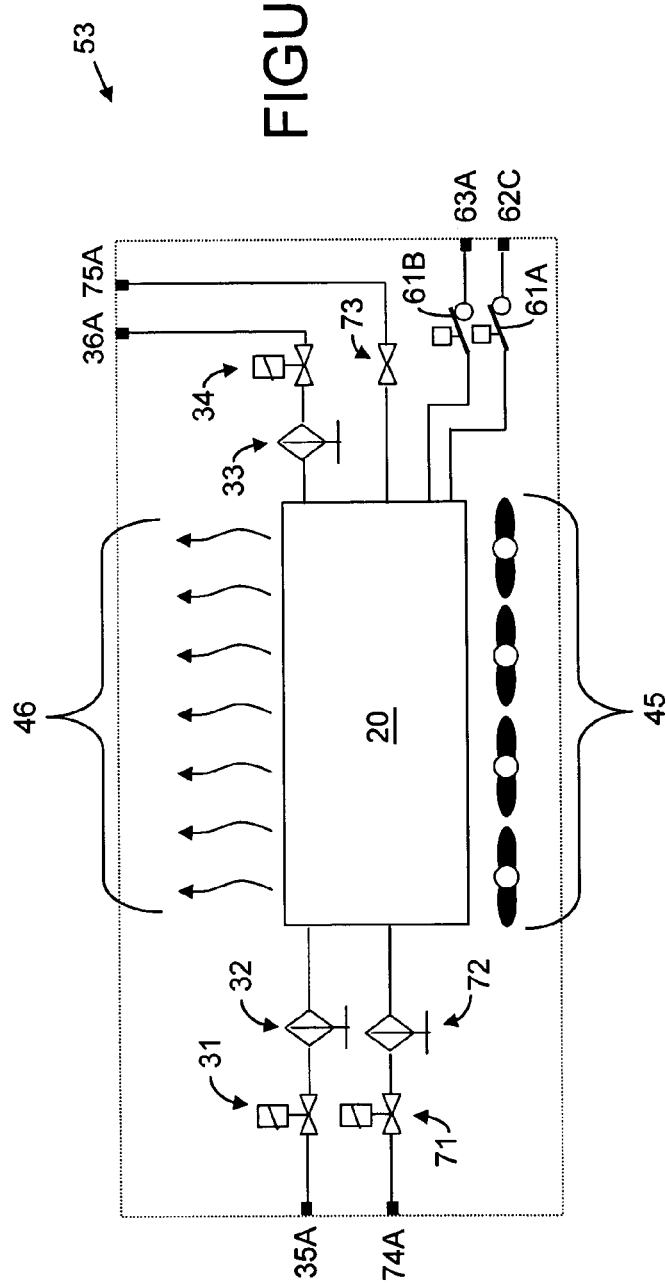
FIG. 6a is a schematic that represents the fluid and electrical connections of the power production subsystem.

In another embodiment the whole active module (51A) along with the subsystems (52, 53, 54) are contained within an enclosure (59A). See FIG. 4. The enclosure (59A) has vents (47) that allow unused air supplied to the power production subsystem (53) to be expended out of the active module (51A). The power production subsystem (53) consists of a fuel cell stack (20) that is supplied with hydrogen and air. FIG. 6A is a schematic that represents the main components of such a subsystem (53).

Hydrogen to the power production subsystem (53) is fed through a connector (35A). Within this embodiment a solenoid valve (31) controls the flow of hydrogen to the fuel cell stack (20). A filter (32) is used between the solenoid valve (31) and the fuel cell stack (20) to ensure purity of hydrogen fed to the fuel cell stack (20). An exit path for hydrogen from the power production subsystem (53) is created via a solenoid valve (34) and a outlet connector (36A). A condenser (33) may be placed between the fuel cell stack (20) and the exit solenoid valve (34) to remove any water in the exiting hydrogen stream. The exit solenoid valve (34) controls the hydrogen exit from the power production subsystem (53). One or more fans (45) are used to feed air to the fuel cell stack (20). The exiting air stream (46) from the stack (20) is vented into the environment via the vents (47) on the enclosure of the active module (51 A). A coolant, such as de-ionized water or any other coolant with a similar dielectric strength, is used to cool the fuel cell stack (20). The coolant is fed to the power production subsystem (53) via a connector (74A). Within this embodiment a solenoid valve (71) controls the flow of the coolant through the fuel cell stack (20). A valve (73) is connected to the coolant exit from the fuel cell stack (20). This valve (73) is open during operation and closed only when the subsystem (53) is being removed. The coolant exits the power production subsystem (53) via a fluid connector (75A). Preferably all the fluid connectors (35A, 36A, 74A, 75A) are self-sealing quick-connect/disconnect type connectors.

The electrical power from the fuel cell stack (20) is routed to connectors (62A, 63A) that carry the power from the power production subsystem (53) to the power conditioning and protection subsystem (54). A double-pole single-throw contactor with two poles (61 A,61 B) is used between the fuel cells stack (20) and the connectors (62A, 63A). The contactor has poles (61A,61B) that are normally open. During operation the poles (61A, 61B) are closed to transfer power from the power production subsystem (53). The contactor with poles (61 A, 61 B) can isolate the power production subsystem electrically from the balance of the system.

The power conditioning and protection subsystem (54) connects to the power production subsystem (53) via connectors (62A,62B, 63A,63B).

Figure 6B:
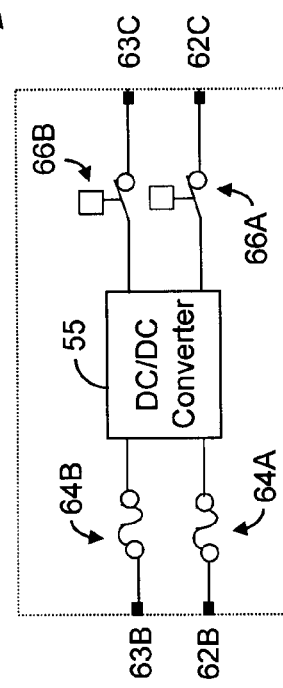
FIG. 6B is a schematic of the electrical connections of the power conditioning and protection subsystem.

The power conditioning and protection subsystem (54) has a voltage conditioning device (65) that regulates the output voltage of the power production subsystem (53). See FIG. 6B. The voltage conditioning device (65) is a DC—DC converter that regulates the DC voltage produced by the fuel cell stack (20) within a tight tolerance. In another embodiment the voltage conditioning device (65) is a DC-AC inverter that converts the DC voltage produced by the fuel cell stack (20) to the required AC voltage that complies with the CBEMA standards. Fuses (64A, 64B) or other protection devices, such as circuit breakers, are used to protect the converter from overloads. The output of the converter (65) is sent out to electrical connectors (62C,63C). Preferably a double-pole single-throw contactor with poles (66A, 66B), which is same as the contactor with poles (61 A, 61 B) used in the power production subsystem (53), is used between the converter (65) and the connectors (62C, 63C).

The control subsystem (52) ensures the proper operation and control of the various devices within the RPM by interfacing with both the power production subsystem (53) and the power control and protection subsystem (54). The control subsystem (52) controls the operation of the solenoid valves (31,34,71), fans (45), contactors (61A, 61B, 66A, 66B) and the converter (65) based on data it collects from the fuel cell stack (20).

Figure 7:
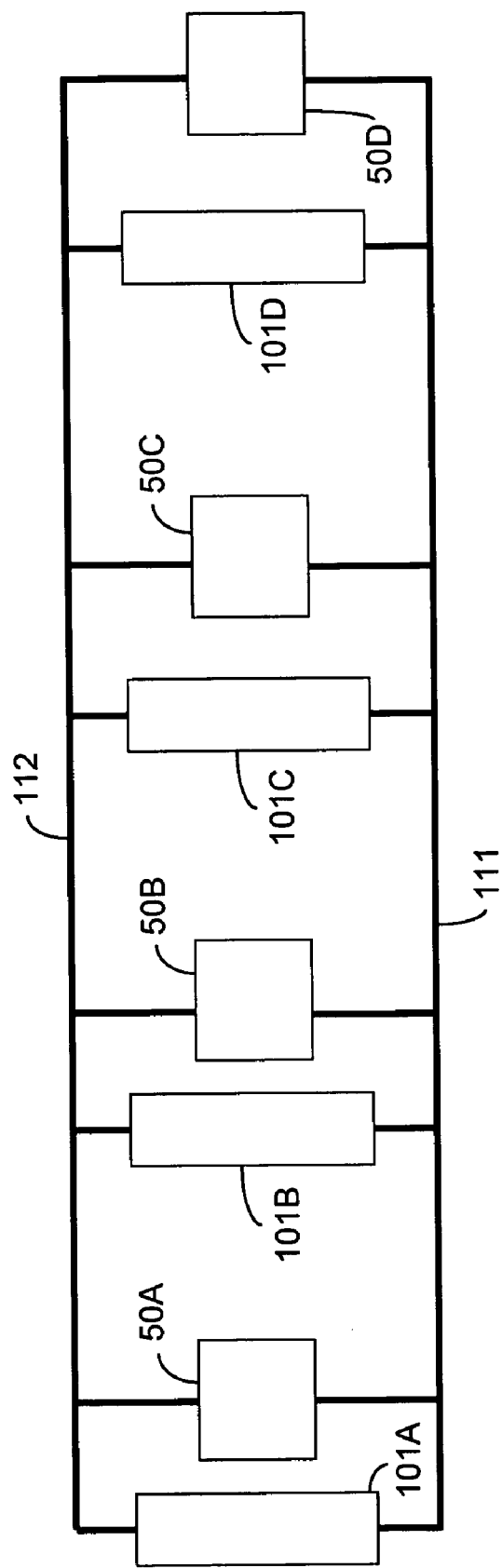
FIG. 7 is a schematic of the electrical connections of 4 rack power modules connected together to form a fault tolerant power network feeding 4 electrical loads.

Two or more RPMs are connected electrically in parallel to DC bus-bars (111, 112). The current embodiment in FIG. 7 is shown with 4 RPMs (50A, 50B, 50C, 50D) connected electrically in parallel between DC busbars (111,112). Electrical loads (101A, 101B, 101C, 101D) are also connected between the same bus-bars (111, 112) in this embodiment. See FIG. 7.

If any one of the RPMs (50A) fails, the remaining RPMs (50B, 50C, 50D) increase their power production and continue to supply the loads (101A, 101B, 101C, 101D) without varying the quality of the power supplied. Within this embodiment if any two of the RPMs (50A, 50B) fail the remaining RPMs (50C, 50D) increase their power production and continue to supply the loads (101A, 101B, 101C, 101D). Within this embodiment if any three of the RPMs (50A, 50B, 50C) fail the remaining RPM (50D) will increase its power production to supply the loads (101A, 101B, 101C, 101D). The fault tolerance capability built into the network can be modified by changing the number of RPMs (50A, 50B, 50C, 50D) connected and/or by changing the peak power capability of each RPM (50A, 50B, 50C, 50D). If any one of the loads (101 A, 101 B, 101 C, 101 D) needs AC power an inverter may be connected to the bus-bars (111, 112) to create AC power from DC.

Figure 8:
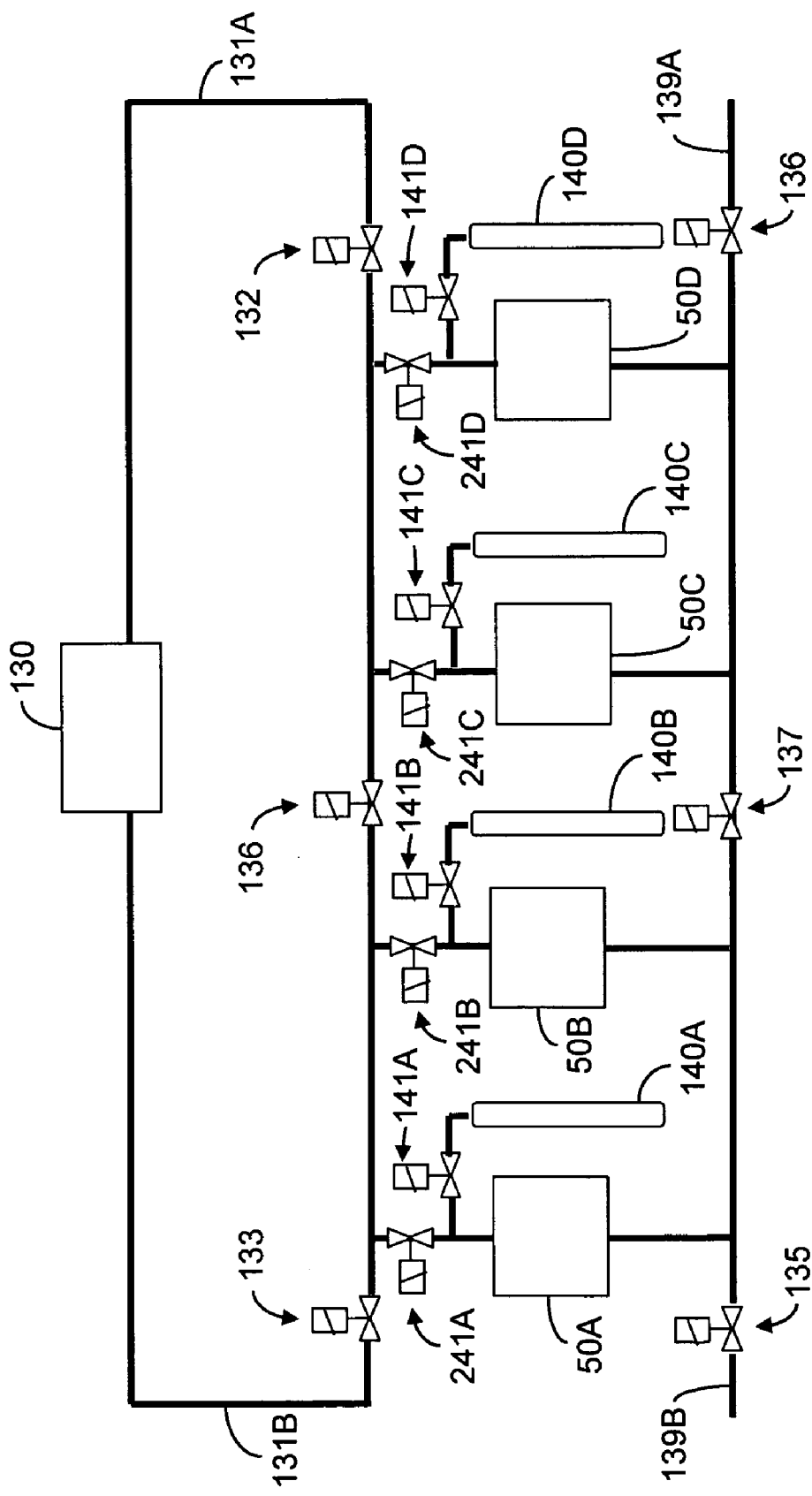
FIG. 8 is a schematic of the hydrogen supply system that feeds the group of 4 rack power modules that are electrically connected together to form the fault tolerant power network.

Hydrogen is fed to the RPMs (50A, 50B, 50C, 50D) by common hydrogen inlet manifolds (131A, 131B) from a hydrogen source like a storage tank or a reformer or a combination of the two (130). See FIG. 8. Solenoid valves (132, 133, 136) are used to segment sections of the manifold such that any individual section can be isolated from hydrogen flow. Outlet manifolds (139A, 139B) are used to allow hydrogen to flow through the RPMs (50A, 50B, 50C, 50D) and be vented if required during operation. Solenoid valves (134, 135, 137) are used to segment sections of the outlet manifold between (139A, 139B) such that any individual section can be isolated from hydrogen flow. A hydrogen storage system (140A, 140B, 140C,140D) containing hydrogen, hydrogen rich gas mixture or a compound from which hydrogen can be readily produced, is used as a backup source of hydrogen for the respective RPMs (50A, 50B, 50C, 50D). Solenoid valves (141A, 141B, 141C, 141D) are used between the RPM and the hydrogen storage devices (140A, 140B, 140C, 140D) to control the flow of hydrogen from the storage device (140A, 140B, 140C, 140D) to the RPMs (50A, 50B, 50C, 50D). If a leak occurs in one of the hydrogen inlet manifolds (131A), it can be shut off and the RPMs (50A, 50B, 50C, 50D) will still receive hydrogen to continue operation. If a leak occurs in the inlet manifold segment between two solenoid valves (132, 136) it can be isolated from supply operations by turning off the respective solenoid valves (132, 136, 241C, 241D) and switching to the hydrogen from the backup supply systems (140C, 140D) by turning on their respective solenoid valves (141 C, 141 D). If no hydrogen backup system (140C, 140D) is available the two RPMs (50C, 50D) are shutdown and the remaining RPMs (50A, 50B) automatically increase their output to supply the required power.

Figure 9:
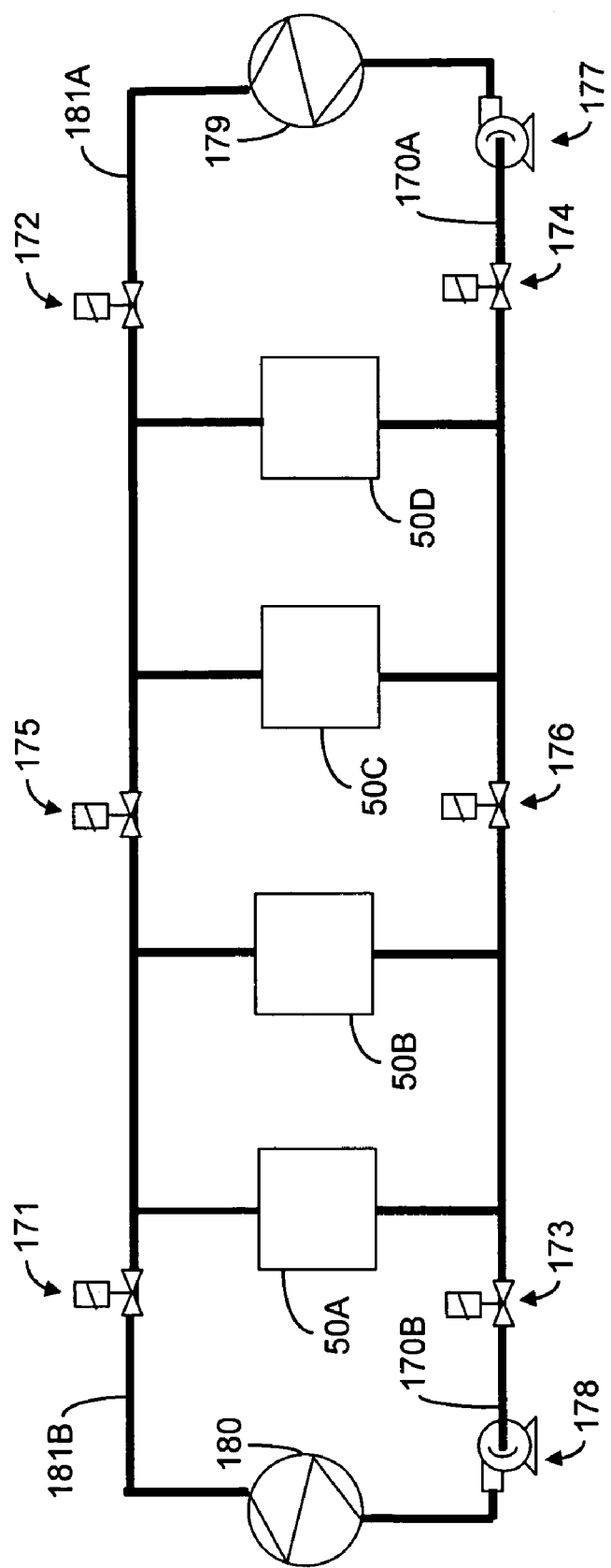
FIG. 9 is a schematic of the coolant recirculation system that manages the heat produced by the rack power modules that are electrically connected together to form the fault-tolerant power network.

A coolant such as de-ionized water, is circulated through the RPMs (50A, 50B, 50C, 50D) and the heat produced during operation of these RPMs (50A, 50B, 50C, 50D) is exchanged via heat exchangers (179, 180). See FIG. 9. Pumps (177, 178) are used to circulate the coolant through the RPMs (50A, 50B, 50C, 50D) and the heat exchangers (179, 180). Solenoid valves (171, 172, 173, 174, 175, 176) are used to control the flow of coolant through the RPMs and isolate individual sections of the coolant system. Under normal operation two of the central solenoid valves (175, 176) between the two inlet manifolds (181A, 181B) and between the two outlet manifolds (170A, 170B) are in the off position while the remaining solenoid valves (171, 172, 173, 174) are in the on position. If one of the pumps (177) fails that section of the coolant loop is isolated by turning off the respective solenoid valves (172, 174) and opening the central solenoid valves (175, 176) effectively circulating all the coolant using a single pump (178) and exchanging the heat using a single heat exchanger (180).

Figure 10:
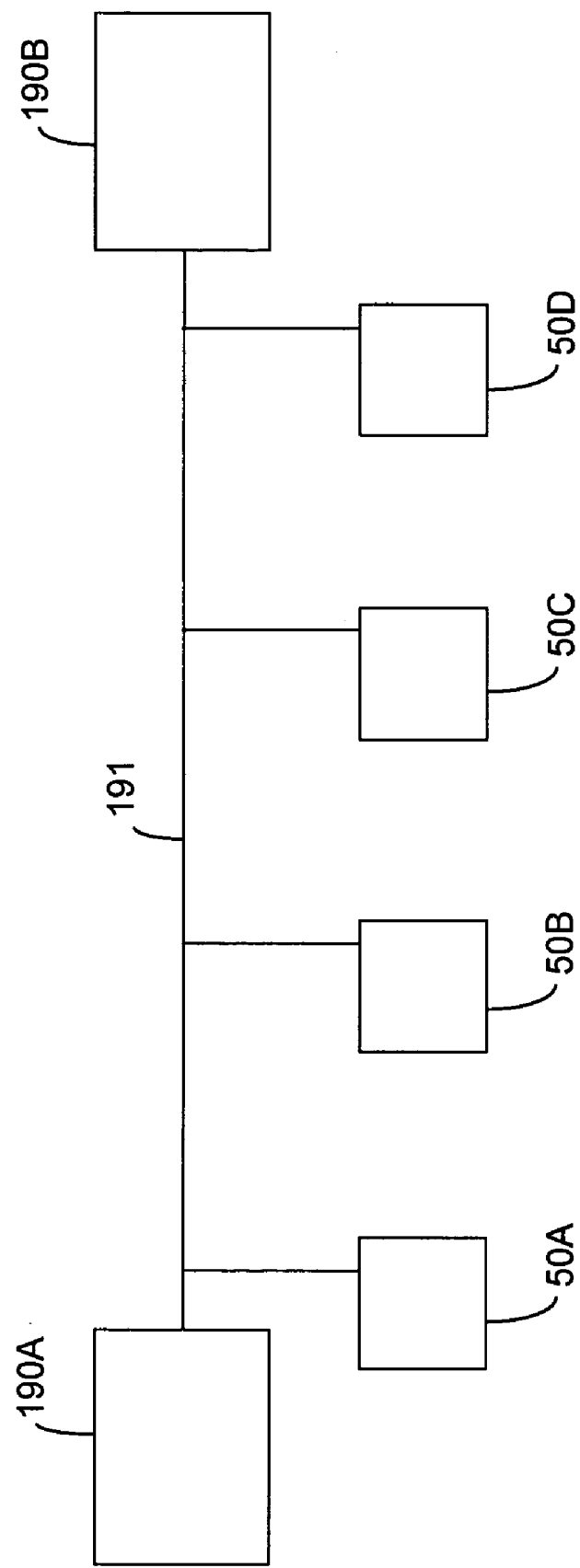
FIG. 10 is a schematic of the control communication system that ensures the communication between the central control and the individual rack power modules.

Two computer master controllers (190A, 190B) are networked with the control subsystem (52) of the individual RPMs (50A, 50B, 50C, 50D) via a control bus (191). See FIG. 10. The computer master controllers (190A, 190B) act as servers in a network and the individual RPMs (50A, 50B, 50C, 50D) act as clients to operate the fault tolerant power network. If any one of the computer master controllers (190A) fails, the other master controller (190B) is capable of maintaining the operation of the power network. If both the master controllers (190A, 190B) fail, the control subsystem (52) of the individual RPMs (50A, 50B, 50C, 50D) can ensure the operation of the fault tolerant power network. The master controllers (190A, 190B) may be connected to a communication gateway like the internet or dedicated communication lines such as a T-1 line or ISDN line to provide remote monitoring capability. More than two master controllers (180A, 180B) can be used in this network to improve the fault tolerance capability of the power network.

Another aspect the invention can be viewed as
 a. a rack power module that consists of a fuel cell power production subsystem, a power management subsystem and a control subsystem;
 b. a hydrogen supply manifold that supplies hydrogen to the rack power modules;
 c. a hydrogen return manifold that removes any exhausted hydrogen away from the stack;

d. individual hydrogen storage systems that back up hydrogen supply to each RPM;
e. coolant supply and return manifolds that circulate a coolant, such as deionized water, to expend the heat produced in the fuel cell stack to an external location using a heat exchanger;
f. control subsystems within the rack power module that control the operation of the rack power module;
g. a master control system that interacts with the control subsystems within each rack power module to maintain supervisory control of the entire system and provides the gateway for remote health monitoring;
h. a data bus that provides a method for the master control system to interact with the control subsystems within each rack power module; and
i. a pair of DC buses that represent the electrically-positive and electrically negative terminals of the impressed DC voltage.

All the current embodiments have been described for a power network of four RPMs, however, the embodiments can be applied to larger networks with tens, hundreds or thousands of networked systems.

The invention claimed is:

1. A fuel cell power system comprising:
a plurality of fuel cell power modules, coupled to one or more power busses, to provide electrical power on the one or more power busses, wherein each fuel cell power module includes:
a fuel cell stack;
a voltage conditioning device, coupled to the fuel cell stack, to output power on the one or more power busses; and
a control unit;
one or more hydrogen storage sources, coupled to each fuel cell power module of the plurality of fuel cell power modules; and
a master controller, electrically coupled to the control unit of each fuel cell power module, to control or manage operation of the plurality of fuel cell power modules.

2. The fuel cell power system of claim 1 wherein the voltage conditioning device of each fuel cell power module is a DC—DC converter or a DC-AC inverter.

3. The fuel cell power system of claim 1 further including a back plane, wherein the back plane includes connections to communicate with at least one of the plurality of fuel cell power modules.

4. The fuel cell power system of claim 3 wherein the back plane includes one or more of a fluid, data and power interfaces that connect to an associated fluid, data and power interface of at least one of the plurality of fuel cell power modules.

5. The fuel cell power system of claim 3 wherein the back plane is a module.

6. The fuel cell power system of claim 3 wherein the back plane includes two or more of a fluid, data and power interfaces that connect to an associated fluid, data and power interface of at least one of the plurality of fuel cell power modules.

7. The fuel cell power system of claim 1 wherein each fuel cell power module is a rack fuel cell power module.

8. The fuel cell power system of claim 1 wherein the master controller, in response to a failure, removal or cessation of operation of one or more of the fuel cell power modules, adjusts the operation of the fuel cell power system.

9. The fuel cell power system of claim 1 wherein the fuel cell stack, the voltage conditioning device, and the control unit of each fuel cell power module are independently removable during operation of the fuel cell power system.

10. The fuel cell power system of claim 1 wherein the one or more hydrogen storage sources include a local hydrogen storage source coupled to the fuel cell stack of an associated fuel cell power module.

11. The fuel cell power system of claim 1 wherein the one or more hydrogen storage sources include a common hydrogen storage source coupled to the fuel cell stacks of a plurality of fuel cell power modules.

12. The fuel cell power system of claim 1 wherein the one or more hydrogen storage sources include:
a local hydrogen storage source coupled to the fuel cell stack of an associated fuel cell power module; and
a common hydrogen storage source coupled to the fuel cell stacks of a plurality of fuel cell power modules.

13. The fuel cell power system of claim 12 wherein the local hydrogen storage source and/or the common hydrogen storage source (i) contains hydrogen, in gas or liquid form, and/or (ii) derives hydrogen from any hydrogen containing compound.

14. The fuel cell power system of claim 1 wherein, in response to a failure of a fuel cell power module, at least one of the other fuel cell power modules of the plurality of fuel cell power modules automatically adjust its output power.

15. The fuel cell power system of claim 1 wherein the master controller adjusts the output power of one or more fuel cell power modules in response to a failure, removal or cessation of operation of one or more of the fuel cell power modules.

16. The fuel cell power system of claim 1 wherein the one or more hydrogen storage sources include a common hydrogen storage source, coupled to the fuel cell stacks of a plurality of fuel cell power modules, and wherein the fuel cell power system further includes:
a dual feed hydrogen supply manifold to connect the common hydrogen storage source to the plurality of fuel cell power modules; and
a first set of valves, disposed within the supply manifold, to segment the supply manifold, wherein the first set of valves, in response to control signals, isolates one or more sections of the supply manifold.

17. The fuel cell power system of claim 16 further including:
a dual hydrogen exhaust manifold; and
a second set of valves, disposed within the exhaust manifold, to segment the exhaust manifold, wherein the second set of valves, in response to control signals, isolates one or more sections of the exhaust manifold while allowing one or more of the fuel cell power modules to purge hydrogen.

18. The fuel cell power system of claim 1 wherein the one or more hydrogen storage sources include a common hydrogen storage source, coupled to the fuel cell stacks of a plurality of fuel cell power modules, and wherein the fuel cell power system further includes:
a dual feed hydrogen supply manifold to connect the common hydrogen storage source to the plurality of fuel cell power modules;
a first set of valves, disposed within the supply manifold, to segment the supply manifold, wherein the first set of valves, in response to control signals, isolates individual sections of the supply manifold;
a dual hydrogen exhaust manifold; and
a second set of valves, disposed within the exhaust manifold, to segment the exhaust manifold, wherein the second set of valves, in response to control signals, isolates one or more sections of the exhaust manifold.

19. The fuel cell power system of claim 1 further including:
   dual coolant pumps; and
   dual feed inlet and outlet manifolds, coupled to the plurality of fuel cell power modules;
   wherein the dual coolant pumps supply coolant to dual feed inlet and outlet manifolds.

20. A fuel cell power system comprising:
   a plurality of fuel cell power modules, coupled to one or more power busses, to provide electrical power on the one or more power busses, wherein each fuel cell power module includes:
      a fuel cell stack;
      a voltage conditioning device, coupled to the fuel cell stack, to output power on the one or more power busses; and
      a control unit; and
   one or more hydrogen storage sources, coupled to each fuel cell power module of the plurality of fuel cell power modules;
   a master controller, electrically coupled to the control unit of each fuel cell power module, to control or manage operation of the plurality of fuel cell power modules; and
   wherein the plurality of fuel cell power modules are connected to form a fault-tolerant power network.

21. The fuel cell power system of claim 20 wherein the voltage conditioning device of each fuel cell power module is a DC—DC converter or a DC-AC inverter.

22. The fuel cell power system of claim 20 further including a back plane, wherein the back plane includes connections to communicate with at least one of the plurality of fuel cell power modules.

23. The fuel cell power system of claim 22 wherein the back plane includes fluid and power interfaces that connect to fluid and power interfaces of a fuel cell power module.

24. The fuel cell power system of claim 22 wherein the back plane is a module.

25. The fuel cell power system of claim 22 wherein the back plane includes data and power interfaces that connect to data and power interfaces of a fuel cell power module.

26. The fuel cell power system of claim 20 wherein each fuel cell power module is a rack fuel cell power module.

27. The fuel cell power system of claim 20 wherein the master controller, in response to a failure, removal or cessation of operation of one or more of the fuel cell power modules, adjusts the operation of the other fuel cell power modules.

28. The fuel cell power system of claim 20 wherein the one or more hydrogen storage sources include a local hydrogen storage source, coupled to the fuel cell stack of an associated fuel cell power module.

29. The fuel cell power system of claim 20 wherein the one or more hydrogen storage sources include a common hydrogen storage source coupled to the fuel cell stacks of a plurality of fuel cell power modules.

30. The fuel cell power system of claim 20 wherein the one or more hydrogen storage sources include:
   a local hydrogen storage source coupled to the fuel cell stack of an associated fuel cell power module; and
   a common hydrogen storage source coupled to the fuel cell stacks of a plurality of fuel cell power modules.

31. The fuel cell power system of claim 30 wherein the local hydrogen storage source and/or the common hydrogen storage source (i) contains hydrogen, in gas or liquid form, and/or (ii) derives hydrogen from any hydrogen containing compound.

32. The fuel cell power system of claim 20 wherein the master controller adjusts the output power of one or more fuel cell power modules in response to a failure, removal or cessation of operation of one or more of the fuel cell power modules.

33. The fuel cell power system of claim 20 wherein the one or more hydrogen storage sources include a common hydrogen storage source, coupled to the fuel cell stacks of a plurality of fuel cell power modules, and wherein the fuel cell power system further includes:
   a dual feed hydrogen supply manifold to connect the common hydrogen storage source to the plurality of fuel cell power modules; and
   a first set of valves, disposed within the supply manifold, to segment the supply manifold, wherein the first set of valves, in response to control signals, isolates one or more sections of the supply manifold.

34. The fuel cell power system of claim 33 further including;
   a dual hydrogen exhaust manifold; and
   a second set of valves, disposed within the exhaust manifold, to segment the exhaust manifold, wherein the second set of valves, in response to control signals, isolates one or more sections of the exhaust manifold while allowing one or more of the fuel cell power modules to purge hydrogen.

35. The fuel cell power system of claim 20 wherein the one or more hydrogen storage sources include a common hydrogen storage source, coupled to the fuel cell stacks of a plurality of fuel cell power modules, and wherein the fuel cell power system further includes:
   a dual feed hydrogen supply manifold to connect the common hydrogen storage source to the plurality of fuel cell power modules;
   a first set of valves, disposed within the supply manifold, to segment the supply manifold, wherein the first set of valves, in response to control signals, isolates individual sections of the supply manifold;
   a dual hydrogen exhaust manifold; and
   a second set of valves, disposed within the exhaust manifold, to segment the exhaust manifold, wherein the second set of valves, in response to control signals, isolates one or more sections of the exhaust manifold.

36. The fuel cell power system of claim 20 further including:
   dual coolant pumps; and
   dual feed inlet and outlet manifolds, coupled to the plurality of fuel cell power modules;
   wherein the dual coolant pumps supply coolant to dual feed inlet and outlet manifolds.

37. The fuel cell power system of claim 20 wherein the master controller allows monitoring of the operability of one or more fuel cell power modules.

38. The fuel cell power system of claim 1 wherein the master controller allows monitoring of the operability of one or more fuel cell power modules.

39. A fuel cell power system comprising:
   a first fuel cell power device including:
      a first fuel cell stack;
      a first voltage conditioning device, coupled to the first fuel cell stack, to output power on one or more power busses; and
      a first control unit;

a second fuel cell power device including:
  a second fuel cell stack;
  a second voltage conditioning device, coupled to the second fuel cell stack,
  to output power on the one or more power busses; and
  a second control unit;
one or more hydrogen storage sources coupled to first and second fuel cell power devices; and
a master controller, electrically coupled to the first and second control units, to control or manage operation of the first and second fuel cell power devices.

40. The fuel cell power system of claim 39 wherein the first and second voltage conditioning devices each include a DC—DC converter or a DC-AC inverter.

41. The fuel cell power system of claim 39 further including a plurality of back planes, wherein each back plane includes connections to communicate with at least one of the first and second fuel cell power devices.

42. The fuel cell power system of claim 41 wherein each back plane includes one or more of a fluid, data and power interfaces that connect to an associated fluid, data and power interface of at least one of the first and second fuel cell power devices.

43. The fuel cell power system of claim 41 wherein each back plane is a module.

44. The fuel cell power system of claim 41 wherein each back plane includes two or more of a fluid, data and power interfaces that connect to an associated fluid, data and power interface of at least one of the first and second fuel cell power devices.

45. The fuel cell power system of claim 39 wherein the first and second fuel cell power devices are rack fuel cell power modules.

46. The fuel cell power system of claim 39 wherein the master controller, in response to a failure, removal or cessation of operation of the first fuel cell power device, adjusts the operation of the second fuel cell power device.

47. The fuel cell power system of claim 39 wherein the first fuel cell stack, the first voltage conditioning device, and the first control unit of the first fuel cell power device are independently removable during operation of the fuel cell power system.

48. The fuel cell power system of claim 39 wherein the one or more hydrogen storage sources include a first local hydrogen storage source coupled to the first fuel cell stack and a second local hydrogen storage source coupled to the second fuel cell stack.

49. The fuel cell power system of claim 39 wherein the one or more hydrogen storage sources include a common hydrogen storage source coupled to the first and second fuel cell stacks.

50. The fuel cell power system of claim 39 wherein the one or more hydrogen storage sources include;
  a first local hydrogen storage source coupled to first fuel cell stack;
  a second local hydrogen storage source coupled to second fuel cell stack; and
  a common hydrogen storage source coupled to the first and second fuel cell stacks.

51. The fuel cell power system of claim 39 wherein, in response to a failure of the first fuel cell power device, the second fuel cell power device automatically adjusts its output power.

52. The fuel cell power system of claim 39 wherein the master controller, in response to a failure, removal or cessation of operation of the first fuel cell power device, adjusts the output power of the second fuel cell power device.

53. The fuel cell power system of claim 39 wherein the master controller allows monitoring of the operability of at least the first fuel cell power device.

54. The fuel cell power system of claim 39 wherein the one or more hydrogen storage sources (i) contains hydrogen, in gas or liquid form, and/or (ii) derives hydrogen from any hydrogen containing compound.

* * * * *